United States Patent [19]

Suzuki et al.

[11] 4,215,734
[45] Aug. 5, 1980

[54] PNEUMATIC TIRE HAVING A DURABLE TREAD OF WIDE WIDTH

[75] Inventors: Yasuo Suzuki, Akigawa; Akira Tamura; Kenji Matsumoto, both of Higashimurayama, all of Japan

[73] Assignee: Bridgestone Tire Company Limited, Tokyo, Japan

[21] Appl. No.: 932,573

[22] Filed: Aug. 10, 1978

[30] Foreign Application Priority Data

Aug. 17, 1977 [JP] Japan .................. 52-97763

[51] Int. Cl.² .................. B60C 11/00; B60C 3/00; B60C 9/20
[52] U.S. Cl. .................. 152/209 WT; 152/361 R; 152/352 R; 152/354 R
[58] Field of Search ........... 152/209 R, 209 A, 209 B, 152/209 WT, 352 R, 352 A, 353 R, 353 C, 353 G, 354 R, 361 R, 209 NT, 209 D, 361 DM, 361 FP

[56] References Cited

U.S. PATENT DOCUMENTS

| 2,237,819 | 4/1941 | Hawkinson | 152/209 R |
| 3,559,712 | 2/1971 | Verdier | 152/209 R |
| 3,811,488 | 5/1974 | Duncan | 152/353 R X |
| 3,916,968 | 11/1975 | Masson | 152/361 R X |

Primary Examiner—John T. Goolkasian
Assistant Examiner—Lois E. Rodgers
Attorney, Agent, or Firm—Sughrue, Rothwell, Mion, Zinn and Macpeak

[57] ABSTRACT

A pneumatic tire having a highly durable tread of wide width and having a side cut resistance, a cut through resistance of tread and an improved high-temperature durability of tread is obtained by limiting the width of the main belt based on the tread width and limiting the crown radius of the tread based on the tire diameter.

3 Claims, 10 Drawing Figures

PNEUMATIC TIRE HAVING A DURABLE TREAD OF WIDE WIDTH

The present invention relates to a pneumatic tire having a highly durably tread of wide width, and provides a pneumatic tire for truck, bus, construction vehicles and the like, which has a high durability and can be continuously used for a long period of time without inducing failures even when the tire is used under very severe and highly loaded conditions on the non-paved or coarse off-road.

In the above described tires used in the travelling on the off-road, the rigidity of a belt arranged between a tread and a carcass is generally improved by the use of steel cords and the like. However, the tire using a highly rigid belt is often failured during the rotation under high load due to the heat generated in the tread, particularly at the end of the belt. The present invention aims to prevent in a simple manner the above described drawbacks of the conventional tire and to improve the durability.

The above described pneumatic tires, particularly pneumatic tires for construction vehicle, such as dump truck, are easily damaged in the side wall portion (this damage is generally called as "side cut") due to the obstacles, such as stone, rock, stump and the like, scattered on the road and non-road. In order to prevent the drawbacks, a tire having a tread of wide width, which is so-called as a wide-width tread tire, is used. The wide-width tread tire is considerably high in the ratio of the tread width to the section width than a commonly used tire. The present invention relates to an improvement of the above described wide-width tread tire.

The term "tread width" means a width of ground contact area of a tread which contacts with road surface during the rotation of the tire under load, that is, the distance between the left and right shoulders of the tread. The term "section width" means the maximum distance of the cross-section of a tire in the direction parallel to the rotating axis of the tire between the outer surfaces of both convex side walls of the tire after the tire is inflated under the standard pressure. In a tire having projections at the shoulders, the above described maximum distance is determined by the cross-section of the tire excluding the projections.

For a better understanding of the invention, reference is taken to the accompanying drawings, wherein.

Figure 1:
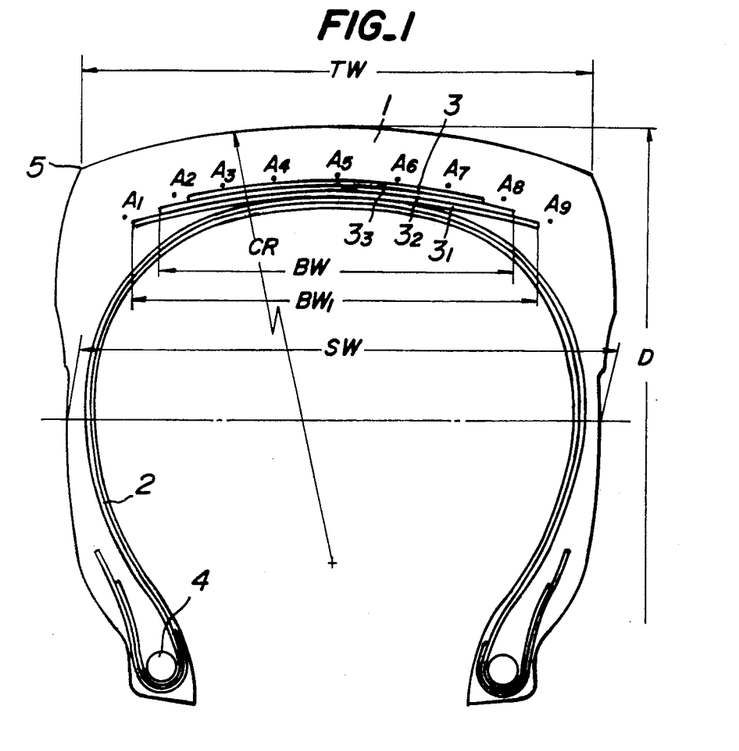
FIG. 1 is a cross-sectional view of a typical pneumatic tire for off-road having a tread of wide width.

In FIG. 1, the numeral 1 represents a tread, the numeral 2 represents a carcass, the numeral 3 represents a three-ply belt, the numeral 4 represents a bead core and the numeral 5 represents a tread end, that is, a shoulder.

Further, in the tire of FIG. 1, the tread width is shown by TW, the section width is shown by SW, the width of a ply having a widest superposed area is shown by BW, the maximum width of the belt is shown by $BW_1$, the crown radius is shown by CR, and the outer diameter of the tire is shown by D.

Figure 2:
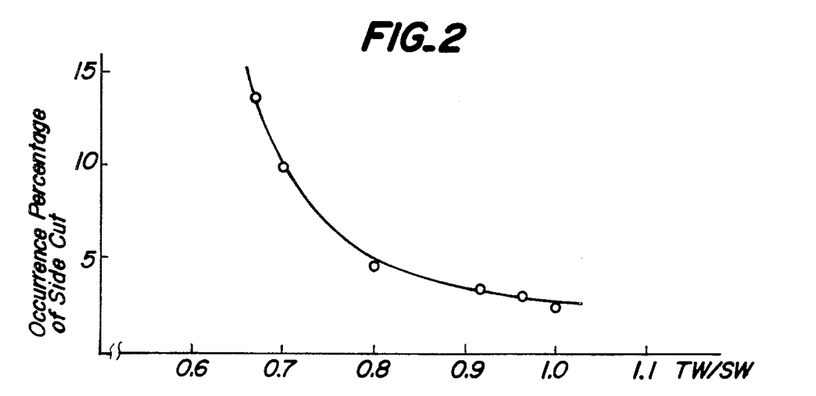
FIG. 2 is a graph showing a relation between the ratio of tread width to section width of a wide-width tread tire and the occurrence percentage of side cut in the tire.

The inventors have already made investigations with respect to the relation between the TW/SW ratio of a wide-width tread tire, ORS 14.00-24 12PR rock tire, and the side cut thereof when the tire is used in a dump truck, and obtained the result as shown in FIG. 2. It can be seen from FIG. 2 that a tire having a TW/SW ratio of not less than 0.8 is considerably smaller in the occurrence percentage of side cut than a tire having a TW/SW ratio of less than 0.8, that the TW/SW ratio of 0.8–1.0 is very effective for improving the cut resistance, and that even the TW/SW ratio of more than 1.0 can not prevent completely the side cut. The side cut is probably caused by the reason that rocks and stones present on the travelling road contact directly with the side portion of a tire and rub strongly the side portion rubber than the reason that the side portion is rubbed by the rebounded rocks and stones. Accordingly, the tread width is enlarged so that the pressure subjected to the contact surface of the tread with ground can be partly supported by the side portion just below the shoulder, whereby the occurrence percentage of side cut is decreased as shown in FIG. 2.

It has been well known that the tread can be prevented for being cut by the use of a highly rigid belt composed of steel cords as described above.

There has been already used a combination system of such high-rigidity belt and wide-width tread in the carcass structure of both radial tire and bias tire, and the cut resistance of the tires has been improved. However, the resulting radial or bias tire generally has a large tread and easily generates heat at the belt portion. Therefore, when the tire is driven at a relatively high speed, the belt ends are easily separated due to the heat generated in the tread portion. The reason is that the strain concentrated in the belt having a high rigidity, particularly at the end of the belt, and the fatigue of rubber and the heat generated therein due to the repeated bendings of the rubber caused by the revolution of the tire synergistically accelerate the breakage of the adhesion of the belt.

However, high speed running of a tire even on off-road is more and more demanded in order to improve the productivity in transportation operation, and hence the improvement of resistance and durability against heat of the above described wide-width tread tire having a reinforcing belt is demanded.

The inventors have made various investigations in order to satisfy the above described demands, and found that a wide-width tread tire having side cut resistance, cut through resistance and high-temperature durability can be obtained by selecting properly the width BW of the main belt in a multi-ply belt relative to the tread width and further limiting specifically the crown radius of the tread relative to the outer diameter of the tire.

That is, a feature of the present invention is the provision of a pneumatic tire comprising a highly durable tread of wide width, the width TW of said tread being 0.8–1.0 time of the section width SW of the tire, a carcass and a multi-ply belt interposed between the tread and the carcass and having a high rigidity, characterized by limiting the width BW of a main belt to 0.85–0.48 time of the tread width, and limiting the crown radius CR of the wide-width tread to 0.5–0.8 time of the outer diameter D of the tire.

The term "main belt" herein used means a ply having a largest superposed width, which is superposed on another ply, cooperates with the latter ply and serves to improve the rigidity of a tire in its circumferential direction and lateral direction, among plies constituting, for example, a three-ply belt shown in FIG. 1. That is, when the plies are numbered as ply $3_1$, ply $3_2$ and ply $3_3$ in the order as mentioned from the nearest ply to the carcass 2 towards the tread 1, the superposed width of the ply $3_2$ on the ply $3_1$ is maximum. Therefore, in this three-ply belt 3, the ply $3_2$ is the main belt, and the width of the main belt is represented by BW. Accordingly, in a two-ply belt, the narrower ply constitutes a main belt. Further, the width $BW_1$ of the ply $3_1$ is referred to as the maximum width of the belt 3.

Figure 3A:
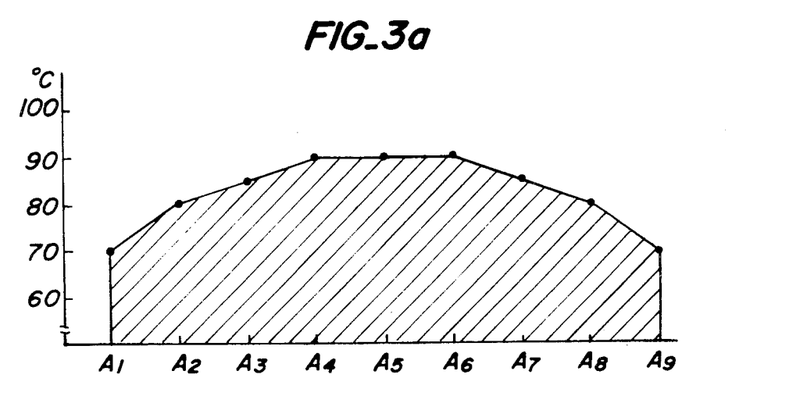
FIGS. 3a, 3b and 3c are graphs showing a temperature distribution in the vicinity of belt in a wide-width tread tire during the running.
Figure 3B:
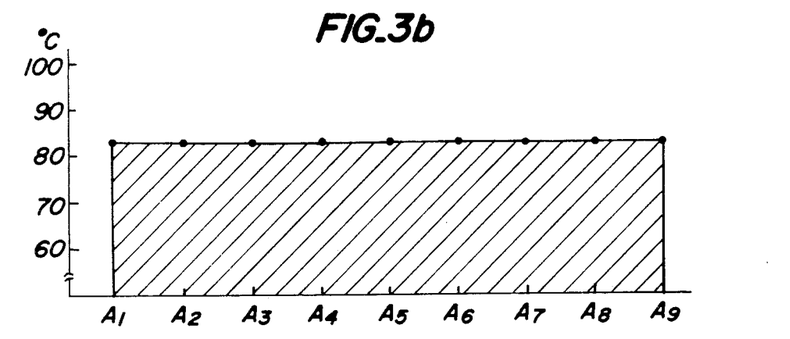
Figure 3C:
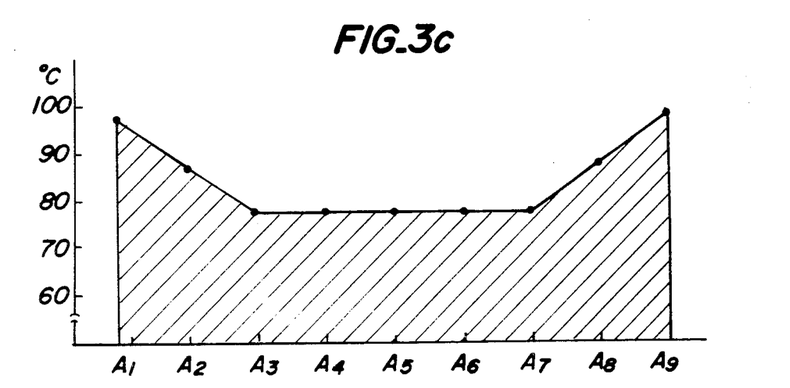

In order to examine previously the high-temperature durability of a tire at the travelling of vehicles provided with the tire and to investigate the improvement of the durability, the temperature of the tire is often measured. That is, the temperature in the interior of a tire kept under a certain running condition is measured. In a tire having a highly rigid belt as shown in FIG. 1, the belt portion is weakest against heat. When the temperature in the vicinity of the belt portion is measured at points $A_1$–$A_9$, which divide the length of an arc along the belt 3 into 8 equal parts at the position just above the belt 3 as shown in FIG. 1, the temperature distribution varies depending upon the load condition and velocity condition, but is generally classified into the following three types: a temperature distribution having a high temperature at the center portion of tire as shown in FIG. 3a, a flat temperature distribution as shown in FIG. 3b, and a temperature distribution having a high temperature at the shoulder portion of tire as shown in FIG. 3c.

In general, when the load applied to a tire is increased, the temperature at the shoulder portion of the tire rises, and when the velocity of a tire is increased, the temperature at the center portion of the tire rises. The weakest portion in the belt portion is the belt end, particularly, the end of two adjacent belts crossed with each other. Because, when a tire is inflated or is loaded, the largest strain occurs in the belt end. Therefore, it is important to lower the temperature at the belt end and on the whole belt.

Of course, as a means for suppressing the heat generation of tire, a tread rubber having a low heat generating property or a thin-gauge tread is effectively used. However, the rubber having a low heat generating property is poor in the cut resistance, and the use of thin-gauge tread is disadvantageous in the tire life determined by tread wear. Therefore, it is advantageous to solve the heat generation of a tire by the design of the tire.

The load applied to a tire is supported by the product of (average contact pressure subjected to tread)×(tread-ground contact area). Supposing that the load is constant and the tread-ground contact area is constant, the contact pressure subjected to the tread distributes variously, but the average contact pressure subjected to the tread is constant.

Heat is generated in a tire due to a repetition of strains produced in tread, and therefore the temperature of the tire is high at a portion, to which a high contact pressure is subjected, and is relatively low in a portion, to which a low contact pressure is subjected.

However, when the average contact pressure subjected to tread is constant as described above, the amount of generated heat can be considered to be constant. The inventors have assumed three types of distributions of contact pressures subjected to tread (temperature distributions due to heat generation of tread) as shown in FIGS. 3a, 3b and 3c, and investigated which of them is most effective for the durability of belt. When the belt width is smaller than the tread width, the amount of generated heat can be represented by the area of the hatched portion shown in FIG. 3a to FIG. 3c. The inventors have found by experiments that the temperature distribution shown in FIG. 3c, wherein the shoulder portion has a high temperature, is most effective.

The temperature distribution shown in FIG. 3c can be obtained by selecting properly the contact shape of tread with ground and the contact pressure subjected to tread.

The contact shape of tread with ground and the contact pressure subjected to tread are highly influenced by the tread width TW and crown radius CR. When the tread width TW is larger than the section width SW, there is no supporter for the shoulder, and hence the contact pressure subjected to tread at the shoulder portion is low. Accordingly, the TW/SW ratio must be not higher than 1.0 in order to obtain the temperature distribution shown in FIG. 3c.

Further, it is important to lower the temperature at the end of belt 3 as low as possible in the temperature distribution shown in FIG. 3c. Therefore, it is necessary that the belt end must be positioned at a position near to the crown center, at which the heat generation is smaller than that in the temperature distributions shown in FIGS. 3a and 3b. Accordingly, in a tire having a temperature distribution shown in FIG. 3c, it is preferable to let the belt end approach to the crown center, that is, to narrow the belt width.

While, the belt serves to keep the shape of a tire to a given shape. Therefore, when the belt width is extremely narrow, the crown radius CR is small, and the aimed temperature distribution can not be obtained. Therefore, it is necessary to determine the belt width by taking the temperature distribution into consideration.

The inventors have found out that the belt width must be at least 60% of section width SW in order to maintain the shape of a tire to a given shape, although the belt width must be changed depending upon the rigidity of belt 3 in the circumferential direction of the tire.

Accordingly, the BW/TW ratio of a tire having a tread of wide width TW must be at least 0.48.

While, the belt width BW of a tire is preferred to be narrow when the tire has a temperature distribution having a high temperature at the hump as described above. The inventors have measured a temperature of a point, which is located at the end of a region having a width of 75% of the tread width (this point is referred to as $\frac{1}{8}$ point hereinafter, because when the tread width is divided into eight equal parts defined by nine points, this point is nearest to the shoulder among the other points), and a temperature of the shoulder.

Figure 4:
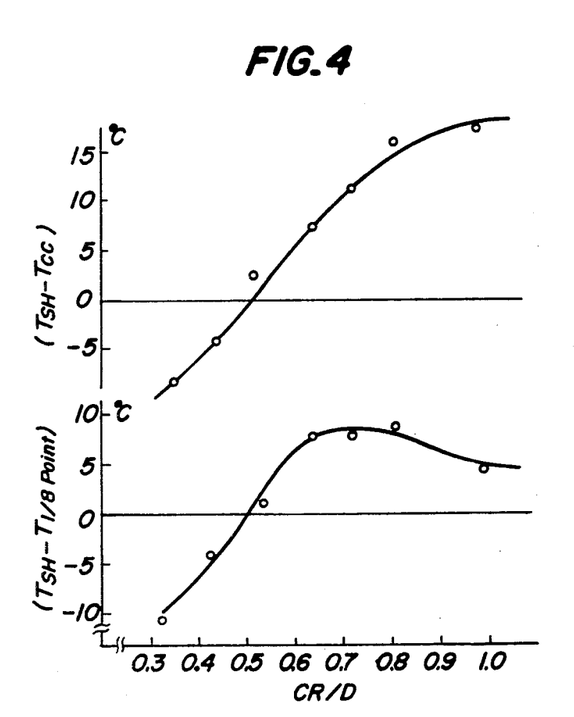
FIG. 4 is a graph showing variation of temperature distribution due to variation of the ratio of crown radius to outer diameter of a wide-width tread tire.

FIG. 4 shows the variation of temperature distribution in the tread due to the variation of the CR/D ratio in a tire having a TW/SW ratio of 0.93. In FIG. 4, the abscissa shows the CR/D ratio, and in the upper half of FIG. 4 the ordinate shows the temperature difference between the shoulder and the crown center, and in the lower half thereof the ordinate shows the temperature difference between the shoulder and the ¼ point. This heat generation test was carried out at a speed of 30 km/hr under a load of 100% (TRA).

It can be seen from FIG. 4 that the temperature distribution depends upon the CR/D ratio. When the running condition is different from the above described condition, for example, when the load is higher, a temperature distribution having a high temperature at the hump is obtained even in a low CR/D ratio, and when the speed is higher, a temperature distribution having a high temperature at the center is obtained.

The reason why the CR/D ratio is used as the abscissa is as follows. The temperature distribution even in the cross-sectional direction of a tire can not be completely free from the influence of the rigidity of the tire in its circumferential direction. Further, a tire having a large diameter D has necessarily a large tread width TW, and therefore the crown radius CR must be large. Therefore, the use of CR/D ratio is advantageous to treat analogously the shape of tire.

The meaning of the graphs shown in FIG. 4 will be explained in more detail hereinafter.

The graphs of FIG. 4 show the results of tests carried out in tires having various sizes. In the upper half of FIG. 4, the ordinate represents the difference ($T_{SH}-T_{CC}$), wherein $T_{SH}$ represents an average temperature at points $A_1$ and $A_9$, and $T_{CC}$ represents an average temperature at points $A_2-A_8$ in FIG. 3. That is, the higher the CR/D ratio, the higher the temperature at the hump is, and a temperature distribution as shown in FIG. 3c is obtained. A temperature distribution as shown in FIG. 3b is formed at a CR/D ratio of 0.5. Therefore, the aimed temperature distribution having a high temperature at the hump can be obtained at a CR/D ratio of not less than 0.5.

In the lower half of FIG. 4, the ordinate represents the difference ($T_{SH}-T_{¼\ point}$), wherein $T_{SH}$ has the same meaning as described above the $T_{150\ point}$ represents an average temperature at points $A_2$ and $A_8$. The larger is the difference ($T_{SH}-T_{¼\ point}$), the larger the difference between the temperature of shoulder and that of ¼ point is. If the temperature of shoulder is the same with that of ¼ point, even when the temperature distribution has a high temperature at the hump, the temperature distribution has a high temperature at the belt end, and such temperature distribution is not preferable.

That is, a temperature distribution, which has a high temperature at the shoulder and is low and flat in the temperature between both ¼ points, is more preferable. Further, a temperature distribution, which has the same and high temperature at the shoulder and ¼ point and is low and flat in the temperature of the remaining region, and a temperature distribution, which has a gradually decreasing temperature from the shoulder towards the crown center, are not preferable. Accordingly it is desirable that both the difference ($T_{SH}-T_{CC}$) and the difference ($T_{SH}-T_{¼\ point}$) are large.

When the CR/D ratio exceeds 0.8, the difference ($T_{SH}-T_{¼\ point}$) becomes small, that is, $T_{¼\ point}$ increases correspondingly to the increase of $T_{SH}$. Therefore, a temperature distribution having an excessively high temperature at the hump is not effective, and the CR/D ratio must be not higher than 0.8. Of course, when the belt width is smaller, a temperature distribution having a high temperature at the hump can be formed without troubles even in a larger CR/D ratio. While, a larger belt width is disadvantageous in the formation of a temperature distribution having a high temperature at the hump.

It can be concluded from the above described investigations that the BW/TW ratio must be not higher than 0.85, and is preferably not higher than 0.75 in order to obtain a temperature distribution having a high temperature at the hump. While, when the belt effect is taken into consideration, a wide belt having a BW/TW ratio of at least 0.48 is necessary, and a BW/TW ratio of at least 0.55 is preferable. Moreover, it is necessary that the $BW_1/TW$ must be not higher than 0.85, preferably not higher than 0.75, wherein $BW_1$ is the maximum width of belt.

While, the CR/D ratio must be within the range of 0.5-0.8 in order to obtain a temperature distribution having a high temperature at the hump and to decrease the temperatures at the belt and at the belt end, and an optimum CR/D ratio is within the range of 0.55-0.75.

The above described limitations can provide a belt width having an ideal temperature distribution, which can prevent advantageously the side cut and cut through of a wide-width tread tire, and can improve the high-temperature durability of the tire.

All of the above described experiments have been carried out under 100% load and at a speed of 10-70 km/hr, at which a large-size tire ordinarily runs. In the production of a wide-width tread tire to be used under a condition of extremely heavy load or extremely high speed, the optimum value of the above obtained limitations must be selected within the above described ranges by taking the use condition into consideration.

If it is intended to produce a tire having a crown radius CR' in the shoulder portion of a tread, which is different from the crown radius CR in the center portion of the tread, the CR' must be at least 0.3CR. Otherwise, a temperature distribution having a high temperature at the hump can not be obtained.

The present invention can be applied to the production of a belt or a breaker made of a highly rigid material, such as glass fiber or the like, in addition to the production of a belt or breaker made of steel cord.

The above described method for improving the high-temperature durability of a tire based on the temperature distribution having a high temperature at the hump can be particularly effectively applied to tires, which has a high TW/SW ratio in order to prevent the side cut.

In a tire having a low TW/SW ratio of less than 0.8, the belt end is located in the hump due to the belt width necessary for constituting the tire. In this case, it is preferred to produce a tire, which has a temperature distribution having a high temperature at the center portion of crown as shown in FIG. 3a. However, this method is out of the scope of the present invention.

The aimed effect of the present invention can be attained only when the TW/SW ratio, BW/TW ratio and CR/D ratio properly limited as described above are combined.

The belt width BW has an influence upon the heat generation at the tread portion, and a belt generally has a multi-ply structure composed of a plurality of plies. Therefore, among the plies, a main belt is taken into consideration, and the width of the main belt is used as a factor for the determination of the above described dimensions of tire in the present invention.

The present invention will be explained in more detail referring to the following example.

Figure 5A:
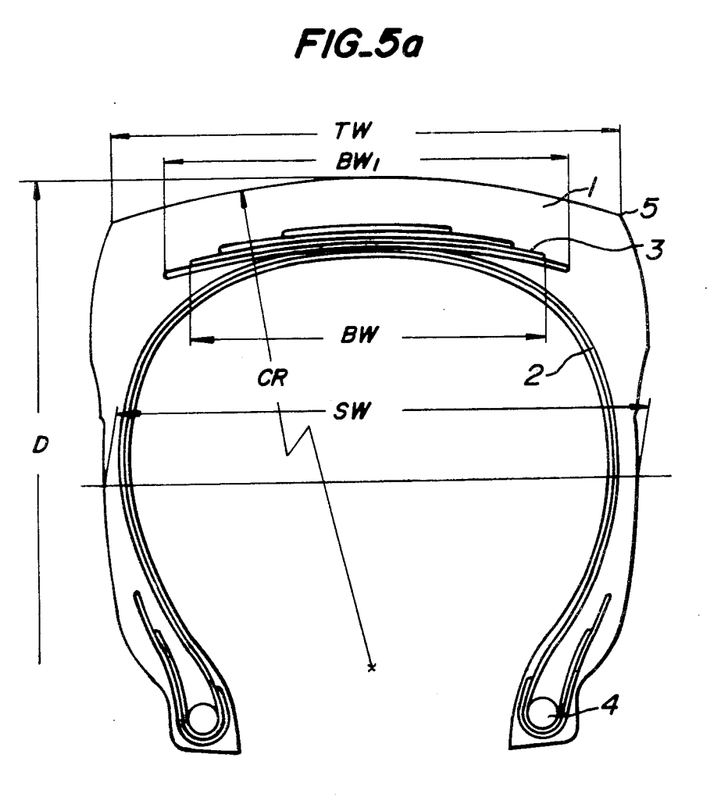
FIG. 5a and FIG. 5b are cross-sectional views of conventional wide-width tread tires.
Figure 5B:
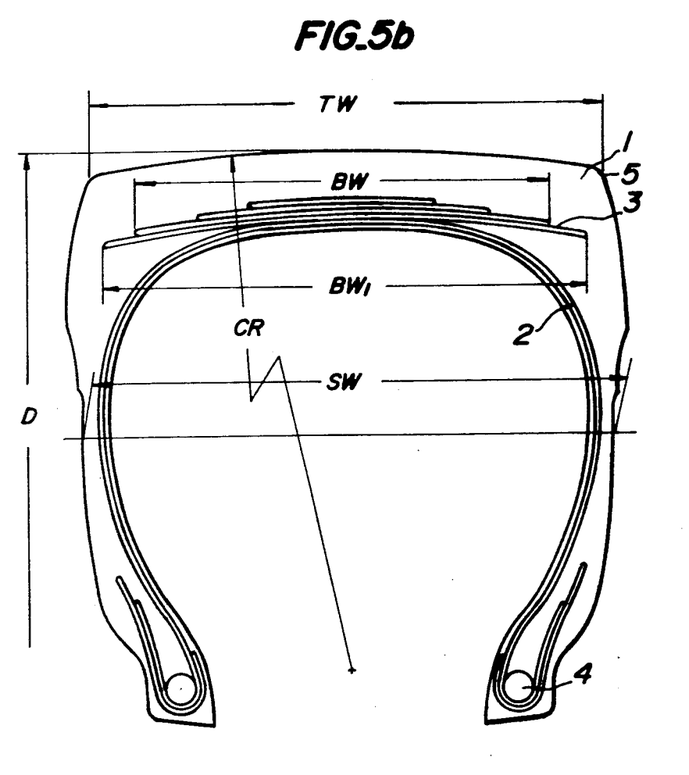
Figure 5C:
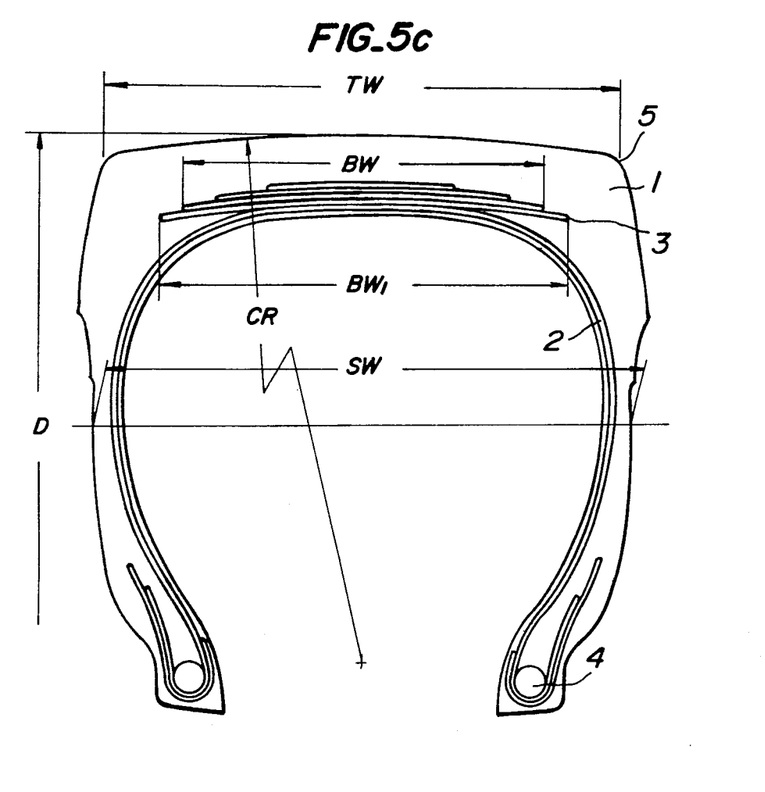
FIG. 5c is a cross-sectional view of the wide-width tread tire according to the present invention.

FIGS. 5a, 5b and 5c are cross-sectional views of tires for construction vehicle having a size of 18.00R25. The tire has a carcass 2 composed of one steel cord ply, which is turned up around a pair of beads, and has a belt 3 composed of four steel cord plies between the tread 1 and the carcass 2.

The steel cords used in the belt are arranged in a small cord angle with respect to the circumferential direction of the tire. The cords in the ply, viewed from the upper portion of tread, are inclined upwardly from left to right, from right to left, from left to right and from right to left in the order as mentioned from the nearest ply to the carcass 2. The width of plies in the belt 3 is stepwisely narrower from the nearest ply to the carcass 2 towards the tread 1. The turn-up portion of the carcass 2 at the bead portion is reinforced with a wire chafer.

When the tire shown in FIG. 5a is called as a X-type tire (comparative tire), that shown in FIG. 5b is called as a Y-type tire (comparative tire), and that shown in FIG. 5c is called as a Z-type tire (tire of the present invention), the dimensions of these tires are as follows.

| Type | TW/SW | $BW_1$/TW | $BW_1$ (mm) | BW/TW | BW (mm) | CR/D |
|---|---|---|---|---|---|---|
| X | 0.95 | 0.79 | 310 | 0.70 | 275 | 0.375 |
| Y | 0.95 | 0.95 | 375 | 0.88 | 345 | 0.560 |
| Z | 0.95 | 0.79 | 310 | 0.70 | 275 | 0.560 |

Figure 6:
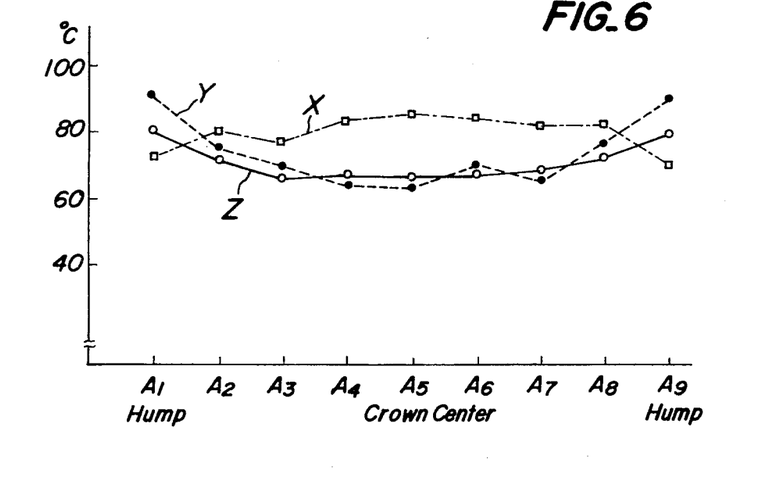
FIG. 6 is a graph showing a comparison in the temperature distribution between the tire according to the present invention and conventional tires.

FIG. 6 shows temperature distributions in the tires after running on a drum tester having a diameter of 5 m at a speed of 30 km/hr under a load of 8.6 tons (TRA: 100%) for 24 hours. The temperature of the tires was measured at the same positions as those shown in FIG. 1 in the vicinity of the belt. It can be seen from FIG. 6 that (1) the Z-type tire of the present invention is lower than the Y-type tire in the temperature in the vicinity of belt end and (2) in the Z-type tire, the temperature in the vicinity of belt end is higher than the temperature in the crown center portion, and further the temperature distribution in the crown center portion is flat.

The above described tires were subjected to a durability test for belt by means of the same drum tester as described above. In the test, a tire is run at a constant speed of 30 km/hr until the belt is broken by a step load system, wherein the load is increased stepwise from 40%. The results are as follows.

X-type tire: 3,100 km
Y-type tire: 2,715 km
Z-type tire: 4,350 km

In this example, radial tires are used. However, of course, the present invention is effective also for bias tires having a steel cord belt. When it is intended to form a shoulder portion extending from the 75% point to the end of a tread by the use of a crown radius CR', which is different from the crown radius CR of the center portion of the tread, in order to improve the resistance against uneven wear and shoulder wear, if the crown radius CR' is too small, the action of the tread on the hump caused by the contact of the tread with ground is not sufficiently high, and a temperature distribution having a high temperature at the hump is not formed, and hence such tread has substantially the same drawback as the drawback of a tread having a small crown radius CR. Therefore, the crown radius CR' of the shoulder portion must be at least 0.3CR.

Further, in the case where it is necessary to widen the belt width in order to improve the cut resistance of a tire, when the maximum width of the belt is made large without changing the width of a main belt, the object can be attained.

What is claimed is:

1. A pneumatic tire comprising a durable tread of wide width, the width TW of said tread being 0.8–1.0 times the section width SW of the tire, a carcass and a multiply belt interposed between the tread and the carcass and having a high rigidity, characterized by: the width BW of a main belt being limited to 0.85–0.48 times the tread width TW, the maximum belt ply width $BW_1$ being limited to 0.85 times the tread width TW, and the crown radius CR of the wide-width tread being limited to 0.5–0.8 times the outer diameter D of the tire.

2. The pneumatic tire according to claim 1, wherein said carcass has a radial structure.

3. The pneumatic tire according to claim 1, wherein the crown radius CR' of the shoulder portion at the end of the wide-width tread is at least 0.3CR.

* * * * *